United States Patent [19]

Chi

[11] Patent Number: 5,605,075

[45] Date of Patent: Feb. 25, 1997

[54] ANTI-DEFORMING MEANS FOR A STEERER TUBE

[76] Inventor: Yi-Chen Chi, No. 139-5, Ann-may Rd., May-San Village, Ho-li Hsian, Taichung Hsien, Taiwan

[21] Appl. No.: 455,721

[22] Filed: May 31, 1995

[51] Int. Cl.⁶ ............................. F16B 7/10; B62K 21/16
[52] U.S. Cl. .................. 74/551.1; 280/279; 403/370; 403/374; 403/24
[58] Field of Search ................ 74/551.1–551.8; 280/279, 280; 403/365, 367, 368, 370–374, 24

[56] References Cited

U.S. PATENT DOCUMENTS

| | | | |
|---|---|---|---|
| 2,430,524 | 11/1947 | Miller | 74/551.1 |
| 4,068,858 | 1/1978 | Harrison et al. | 280/289 R |
| 4,167,352 | 9/1979 | Pletscher | 403/374 X |
| 5,085,063 | 2/1992 | Van Dyke et al. | 280/280 X |
| 5,178,035 | 1/1993 | D'Aluisio | 74/551.1 |
| 5,197,349 | 3/1993 | Herman | 74/551.1 |
| 5,201,242 | 4/1993 | Chi | 74/551.1 |
| 5,213,006 | 5/1993 | Liao | 403/374 |
| 5,303,611 | 4/1994 | Chi | 280/279 X |
| 5,387,255 | 2/1995 | Chiang | 74/551.1 |
| 5,400,676 | 3/1995 | Kao | 74/551.1 |
| 5,442,973 | 8/1995 | Liao | 74/551.1 |
| 5,454,281 | 10/1995 | Chi | 280/279 X |
| 5,496,126 | 3/1996 | Lin | 403/373 X |
| 5,536,104 | 7/1996 | Chen | 403/370 |

FOREIGN PATENT DOCUMENTS

| | | | |
|---|---|---|---|
| 572258 | 6/1924 | France | 74/551.1 |
| 7203 | 3/1907 | United Kingdom | 74/551.1 |

Primary Examiner—Vinh T. Luong
Attorney, Agent, or Firm—Morton J. Rosenberg; David I. Klein

[57] ABSTRACT

An anti-deforming device for a steerer tube includes a tubular element, a first element, a second element, a driving element and a cap, the tubular element having two ends each of which has a tapered periphery for respectively engagement with a corresponding tapered skirt of the first element and the second element, the tubular element having a plurality of slits defined therein and having a plurality of protrusions and flanges extending outwardly from a periphery thereof, the driving element having a threaded rod passing through a plane hole defined in the second element and threadedly engaged to a threaded hole defined in the first element to force the protrusions and flanges to contact against an inner periphery of the steerer tube and the cap mounted to a top of the steerer tube by passing a bolt through a hole defined in the cap and threadedly engaged to the threaded hole of the first element.

1 Claim, 4 Drawing Sheets

ANTI-DEFORMING MEANS FOR A STEERER TUBE

BACKGROUND OF THE INVENTION

1. Field of Invention

The present invention relates to an anti-deforming means for a steerer tube and more particularly, to an anti-deforming means disposed in the steerer tube to which a handlebar stem is securely engaged.

2. Related Prior Art

Referring to FIGS. 1 and 2, there is a kind of handlebar stem 80 having a vertical portion 81 and an inclined portion 82 extending from the vertical portion 81, the vertical portion 81 has a slit 801 longitudinally defined in a periphery thereof, each of the two opposite sides defining the slit 801 of the vertical portion 81 has two lugs 83 extending radially therefrom and each lug 83 has a hole defined therein such that the vertical portion 81 is securely mounted to a steerer tube 70 by engaging the corresponding pair of lugs 83 respectively extending from the two opposite sides defining the slit 801 by a bolt 84 and a nut (not shown). However, the steerer tube 70 securely engaged by the vertical portion 81 of the handlebar may be deformed inwardly because the steerer tube 70 is only a thin tube and is not allowed to increase its thickness in order to maintain an important character of lightness. Therefore, an anti-deforming means is employed to be disposed in the steerer tube 70, which includes an expander 90, a cap 94 and a driving element 93, the expander 90 has a tubular portion 901 through which a threaded hole 902 is centrally defined and two skirt portions 903 extending inclinedly and upwardly from an outer periphery of the tubular portion 901. The cap 94 has the same outer diameter as the steerer tube 70 so as to be put on a top of the steerer tube 70 and has a hole 941 defined in a center thereof. The driving element 93 includes a head 931 having the same outer diameter as the vertical portion 81 and a threaded rod 932 extending from an under side of the head 931 such that the threaded rod 932 passes through the hole 941 and threadedly engaged to the tubular portion 901 of the expander 90 received in the steerer tube 70, the two skirt portions 903 therefore respectively engages to an inner periphery of the steerer tube 70 and to provide an outward and radial force to the steerer tube 70 to prevent the steerer tube 70 from being deformed. However, such a skirt portion 903 provides only a limited support because of its thin-blade type and limited contact area between the skirt portion 903 and the steerer tube 70.

The present invention intends to provide an anti-deforming means which provides a firmly support to the steerer tube to mitigate and/or obviate the above-mentioned problems.

SUMMARY OF THE INVENTION

The present invention provides an anti-deforming means for a steerer tube, which includes a tubular element, a first element, a second element, a driving element and a cap, the tubular element having two ends each of which has a tapered periphery for respectively engagement with a corresponding tapered skirt of the first element and the second element, the tubular element having a plurality of slits defined therein and having a plurality of protrusions and flanges respectively extending outwardly from an outer periphery thereof, the driving element having a threaded rod passing through a plane hole defined in the second element and threadedly engaged to a threaded hole defined in the first element to force the protrusions and the flanges to contact against an inner periphery of the steerer tube, the cap mounted to a top of the steerer tube by passing a bolt through a hole defined therein and threadedly engaged to the threaded hole of the first element.

It is an object of the present invention to provide an anti-deforming means disposed in a steerer tube and which provides a larger contact area with the steerer tube so as to effectively prevent the steerer tube from being deformed.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
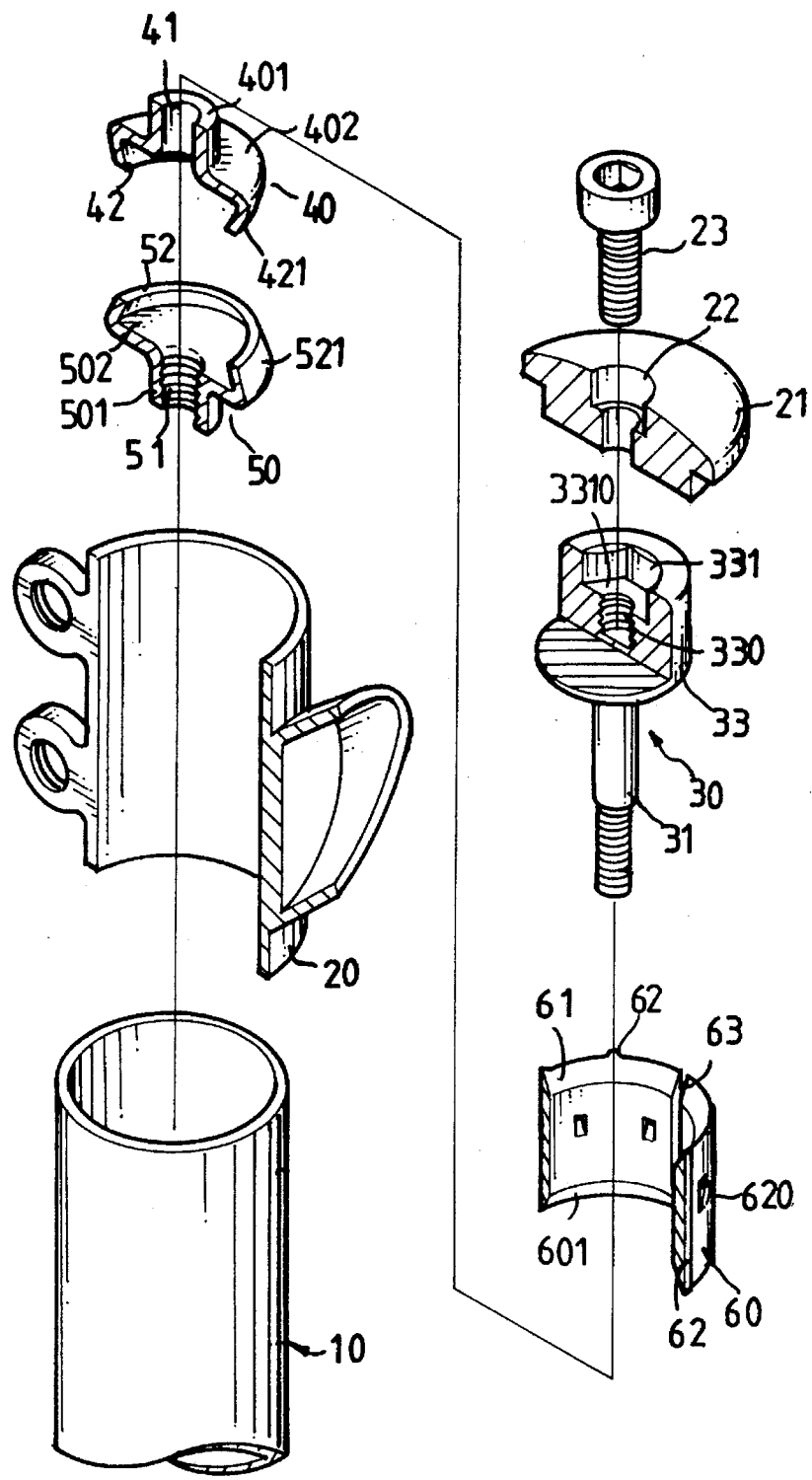
FIG. 3 is an exploded view of an anti-deforming means in accordance with the present invention.
Figure 4:
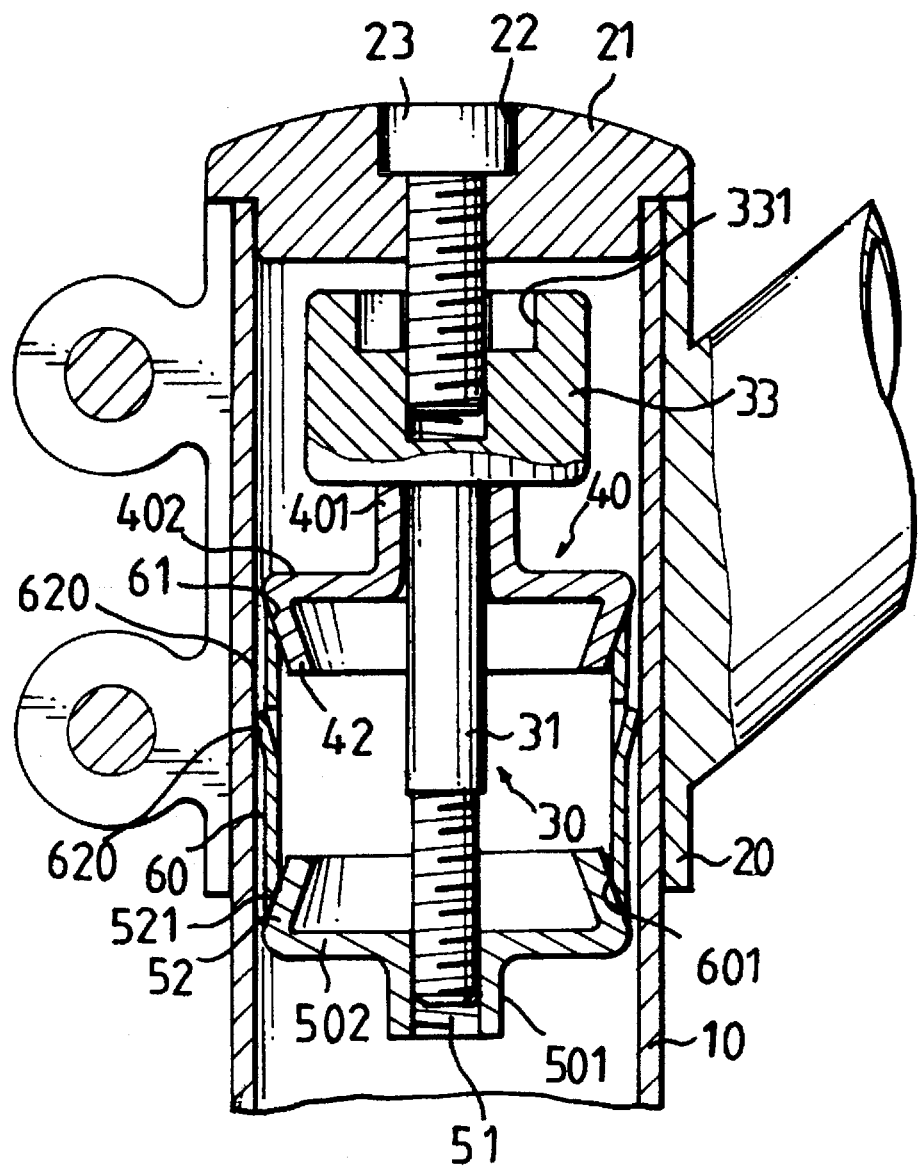
FIG. 4 is a side elevational view, partly in section, of the anti-deforming means in accordance with the present invention disposed in a steerer tube.

Referring to FIGS. 3 and 4, an anti-deforming means in accordance with the present invention generally includes a tubular element 60, a first element 50, a second element 40, a driving element 30 and a cap 21, the tubular element 60 having a first end and a second end, each of the first end and the second end having a respective tapered periphery 601, 61 formed thereon but each of the two tapered peripheries 601, 61 extending to a direction opposite from each other, a plurality of slits 63 longitudinally defined in the tubular element 60 to provide a flexible feature for the tubular element 60 and a plurality of protrusions 620 extending outwardly and inclinedly from an outer periphery of the tubular element 60, each of the protrusions 620 having an end formed integrally with the tubular element 60 and a distal end. The tubular element 60 has a plurality of flanges 62 extending longitudinally from the outer periphery thereof.

The first element 50 has a first stud 501 and a first skirt 52, the first stud 501 having a top flange 502 extending radially from a top thereof and the first skirt extending upwardly from the top flange 502 of the first stud 501 and having a first tapered periphery 521 formed on an outer periphery of the first skirt 52 for engagement with the tapered periphery 601 of the first side of the tubular element 60 and, the first stud 501 has a threaded hole 51 defined therein. The second element 40 has a second stud 401 and a second skirt 42, the second stud 401 having a top flange 402 extending radially from a top thereof and the second skirt 42 extending upwardly from the top flange 402 of the second stud 401 and having a second tapered periphery 421 formed on an outer periphery of the second skirt 42 for engagement with the tapered periphery 61 of the second side of the tubular element 60 and, the second stud 401 has a plane hole 41 defined therein.

The driving element 30 has a head 33 and a threaded rod 31, the head 33 having a polygonal recess 331 defined in an upper side thereof to form a recessed surface 3310 and a threaded recess 330 defined in the recessed surface 3310 defining the polygonal recess 331, the threaded rod 31 extending through the plane hole 41 of the second element 40 and threadedly engaged with the threaded hole 51 of the first element 50 so as to expand the tubular element 60 by the two tapered engagements between the first element 50, the second element 40 and the tubular element 60.

The cap 21 has a hole 22 defined therein for a bolt 23 extending therethrough and the bolt 23 threadedly engaged with the threaded recess 330 of the driving element 30.

Figure 1:
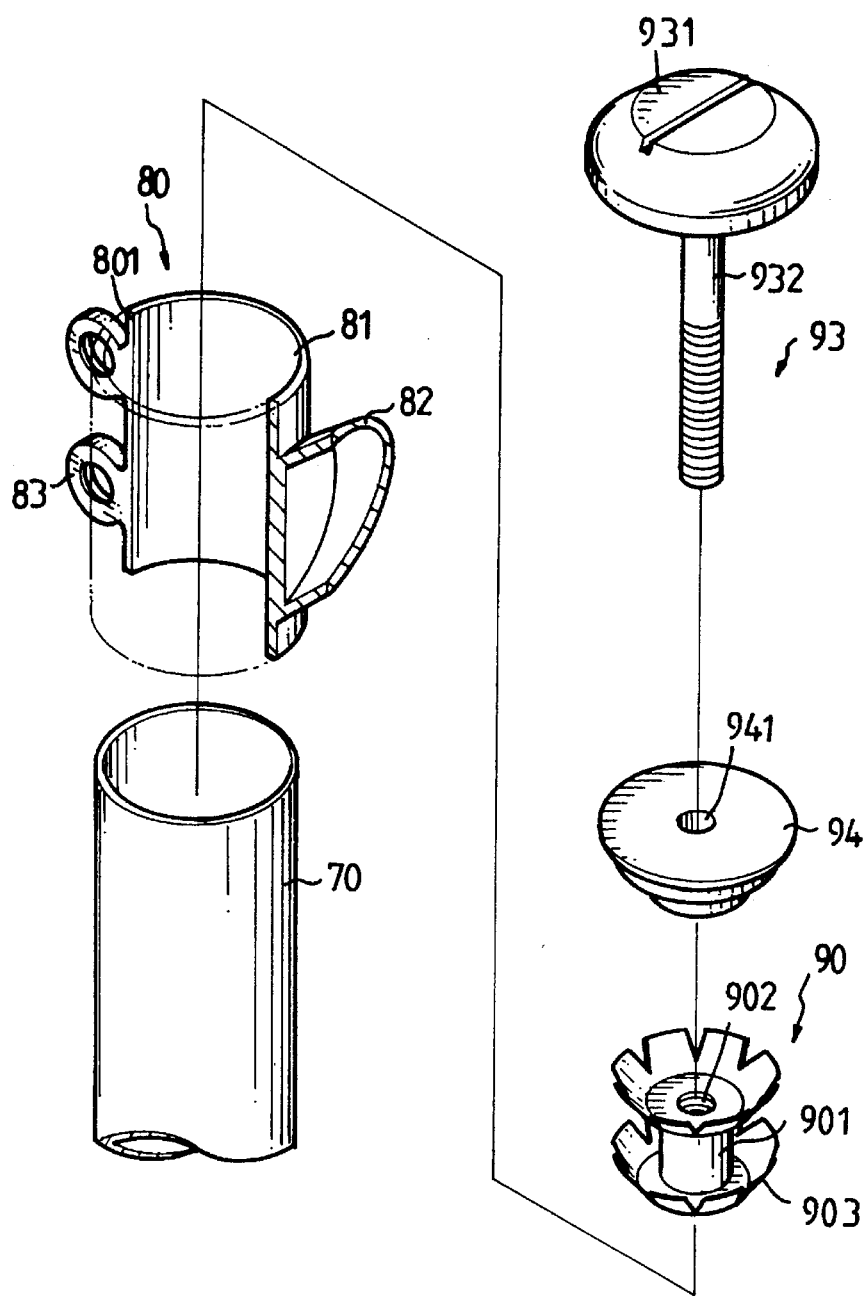
FIG. 1 is an exploded view of a conventional anti-deforming means.
Figure 2:
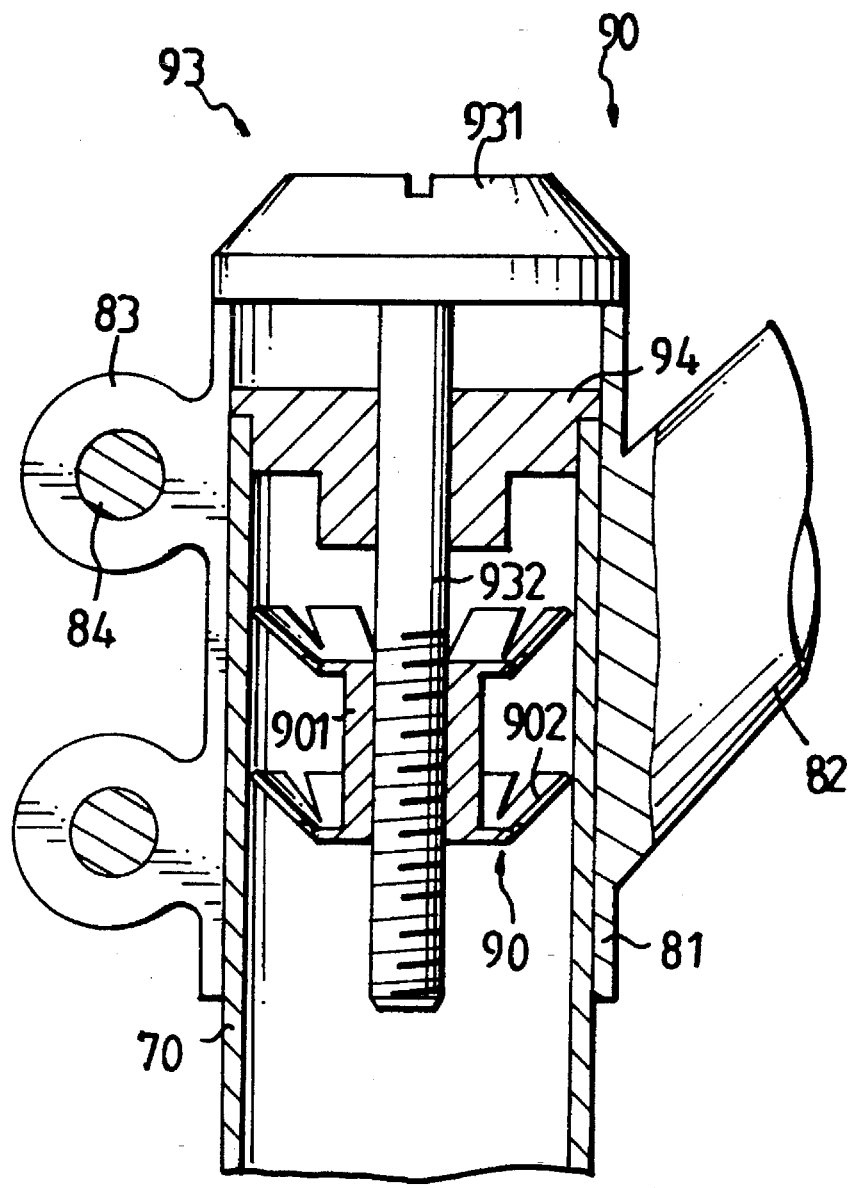
FIG. 2 is a side elevational view, partly in section, of the conventional anti-deforming means disposed in a steerer tube.

When in use, the tubular element 60 is engaged with the first element 50 and the second element 40 at the tapered periphery 601 and the tapered periphery 61 of the tubular element 60 respectively and are all disposed in a steerer tube 10 wherein the protrusions 620 and the flanges 62 of the tubular element 60 contact with an inner periphery of the steerer tube 10 to which the handlebar stem 20 is securely engaged by a manner the same as the prior art shown in FIGS. 1 and 2. The driving element 30 can be rotated by a tool (not shown) engaged with the polygonal recess 331 to pull the first element 50 upwardly and to push the second element 40 downwardly such that the tubular element 60 is expanded to contact against the inner periphery of the steerer tube 10. Accordingly, the force to expand the tubular element 60 is steady and effective and the contact area between the tubular element 60 and the steerer tube 10 is large enough to provide a good anti-deforming feature.

Although the invention has been explained in relation to its preferred embodiment, it is to be understood that many other possible modifications and variations can be made without departing from the spirit and scope of the invention as hereinafter claimed.

I claim:

1. An anti-deforming means for a steerer tube and comprising:

a tubular element having a first end and a second end, each of said first end and said second end having a respective tapered periphery formed thereon but each of said two tapered peripheries extending to a direction opposite from each other, a plurality of slits longitudinally defined in said tubular element, at least one protrusion extending outwardly and inclinedly from an outer periphery of said tubular element and a plurality of flanges extending radially from said outer periphery of said tubular element;

a first element having a first stud and a first skirt, said first stud having a top flange extending radially from a top thereof and said first skirt extending upwardly from said top flange of said first stud and said first stud having a threaded hole defined therein, said first skirt having a first tapered periphery formed on an outer periphery thereof for engagement with said tapered periphery of said first end of said tubular element;

a second element having a second stud and a second skirt, said second stud having a top flange extending radially from a top thereof, said second skirt extending upwardly from said top flange of said second stud and said second stud having a plane hole defined therein, said second skirt having a second tapered periphery formed on an outer periphery thereof for engagement with said tapered periphery of said second side of said tubular element;

a driving element having a head and a threaded rod, said head having a polygonal recess defined in an upper side thereof to form a recessed surface defining said polygonal recess and a threaded recess defined in said recessed surface, said threaded rod extending through said plane hole of said second element and threadedly engaged with said threaded hole of said first element, and a cap having a hole defined therein for a bolt extending therethrough and said bolt threadedly engaged with said threaded recess of said driving element.

\* \* \* \* \*